Sept. 8, 1931. M. R. KONDOLF 1,822,660
ART OF TAGGING
Filed April 20, 1927
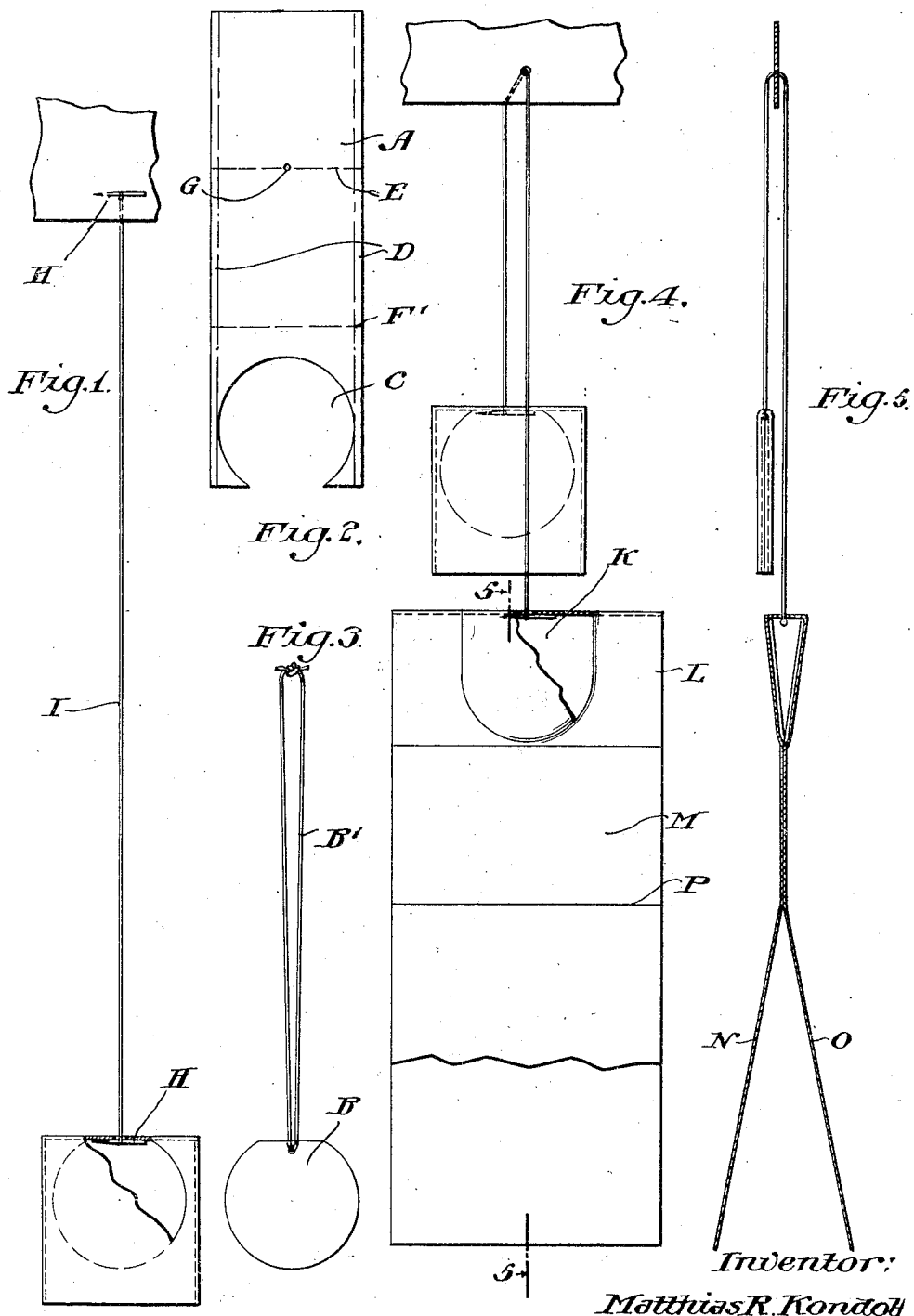
Inventor:
Matthias R. Kondolf
By [signature]
Attorney.

Patented Sept. 8, 1931

1,822,660

UNITED STATES PATENT OFFICE

MATHIAS R. KONDOLF, OF LOWER MERION TOWNSHIP, MONTGOMERY COUNTY, PENNSYLVANIA, ASSIGNOR TO THE LOX SEAL CORPORATION, OF BROOKLYN, NEW YORK, A CORPORATION OF NEW YORK

ART OF TAGGING

Application filed April 20, 1927. Serial No. 185,990.

My invention consists in the attachment of a plurality of tags to merchandise by a single continuous or integral cord which is preferably provided with a needle point or tip at one or both ends for threading the cord through the merchandise and inserting it in one or both tags; the cord being connected with such needle or needles intermediate the ends thereof so that the needles, after insertion, form cross pins preventing the disengagement of cords from the merchandise or from one or both tags.

By the use of my invention the necessity for threading a cord through the merchandise for each tag is eliminated, since the cord attaching the tag of the originator of the goods may be utilized for the attachment of the tag of the distributor of the goods; and but one perforation of the merchandise is necessary for the attachment of both tags; the originator's tag is securely attached to the merchandise, and when the distributor's tag has been added both tags are non-detachable so that losses resulting from substitution or detachment of tags by customers or sales personnel is eliminated; the attachment of tags by the distributor is expedited; simplified forms of tags are made available; errors in tagging are readily traced to the source responsible; the coordination of data ascertainable from the tags is facilitated; and the total cost of tagging is considerably reduced.

It has heretofore been customary for originators of merchandise, particularly manufacturers of wearing apparel, to attach a tag to their products by looping the tag cord over a button, through a buttonhole or the like. Such fastenings are generally very insecure and the tags are not infrequently lost before delivery of the products to the distributor to whom the data on the tags is of importance. If, however, the fastenings are made secure the distributor is put to considerable bother and expense in attaching his own tag fastenings and removing the tag fastenings of the originator, since a multiplicity of cord loops are objectionable to customers.

The attachment of both originator's and distributor's tags by a single cord passed through the merchandise and having an end needle which both securely anchors the originator's tag and forms a simple coupling non-detachably connecting the distributor's tag is of particular advantage where statistical data is derived from tag sections forming control cards for computing and tabulating machines. Hopeless confusion in the operation of such statistical systems results from frequent detachment of tags, yet the cost and bother to the distributor of threading to the merchandise non-detachable tag loops after removing the originator's tag has militated against the use of pocket tags with non-detachable cord fasteners or of seals.

In the preferred practice of my invention, the originator's tag is connected with a cord by the insertion of a needle tip into a pocket in the tag, but the attachment between the originator's tag and cord may be effected by gluing the cord end between the tag laminæ or in any other suitable permanent manner. When a needle cord with an originator tag thereon is passed through the fabric of merchandise, it cannot be readily withdrawn since the needle then lies transversely to the fabric surface, and when the merchandise is received by the dealer or distributor it is only necessary for him to telescope on the needle a tag provided with a pocket for the reception of the needle and which may have sections separable along score lines to provide punched cards for statistical tabulating and computing machines. Such statistical card sections of the tag may be punched appropriately before the attachment of the tag to the needle cord.

The characteristic features and advantages of my improvements will more fully appear from the following description and the accompanying drawings in illustration thereof.

In the drawings, Fig. 1 illustrates a garment section having a manufacturer's tag applied thereto in accordance with my improvements, a part of the tag being broken away; Fig. 2 illustrates a blank from which a manufacturer's tag may be economically made; Fig. 3 illustrates a tally or "tea bag tag" made by looping a cord through the disk or curved fragment cut from a tag blank as illustrated in Fig. 2; Fig. 4 illustrates a garment section having a manufacturer's tag and a dealer's tag applied thereto in accordance with my invention; and Fig. 5 illustrates a sectional view on the line 5—5 of Fig. 4.

As illustrated in the drawings, a tag for attachment by an originator of merchandise may be conveniently made from a blank A having a circular section or disk B cut therefrom to form an aperture C. The blank may have printed thereon desired data, such as the manufacturer's name, style number, size, etc., and has its edges D inturned and preferably glued down on the body which is scored at E and F and provided with a perforation G. The blank so formed is folded so that the section containing the aperture C lies between the other two sections and forms a substantially flat tag, such as shown in Fig. 1, containing a sealed pocket. The tag may be connected to a garment or other article by a flexible tie or cord I having a pointed tip or needle H, H' on each end thereof. Each pointed tip or needle H, H' is connected to the string or tie member I at a point intermediate the needle ends, so that when the needle H is inserted through the opening G into the pocket formed by the aperture C of the tag it turns transversely to the opening and forms a cross pin or anchor preventing the disengagement of the cord and tag.

The needle H' on the free end of the cord is passed through the seam or fabric of a garment J and is detachable therefrom only with difficulty since the needle when once inserted turns transversely to the fabric and anchors the cord thereto.

Upon arrival at a distributor's establishment, a garment tagged as shown in Fig. 1 is provided with a dealer's tag illustrated in Figs. 4 and 5, by drawing up the cord I and inserting the free needle H' in the pocket K of a tag L formed of laminated sheets of printed paper or other suitable tag material. This tag may be formed by laminating and gluing together a printed blank so as to form adjacent to an end thereof the substantially flat pocket K having the greater part of its periphery surrounded by laminæ firmly glued together.

The tag section M containing the pocket may have record portions N and O connected therewith along score lines P. These sections N and O may be simultaneously punched to form record cards for computing and tabulating machines, so that when the tag is attached to a garment or other article the section O may be broken off along the score line for the statistical files dealing with merchandise in stock, and when the garment is sold the section N may be broken off along the score line P for statistical files dealing with merchandise sold.

By the attachment of the originator's tag and distributor's tag to the same cord passing through the article each tag forms a stop preventing detachment of the other and neither tag can be removed without mutilation of a tag or breaking the cord.

As illustrated in Fig. 3, the disk or circular section B cut from the blank A may have a looped cord passed therethrough to form a "tea bag tag".

By a non-detachable tag, as used in the claims, I refer to a tag which when once connected with a cord is inseparable therefrom without mutilation or deformation of the tag or cord.

Having described my invention, I claim:

1. A tag comprising a blank having an apertured end section, and sections bent around opposite sides of said end section to form a pocket, said tag having an aperture leading into said pocket.

2. The combination with a textile garment of a soft flexible cord threaded through a portion thereof, a tag permanently secured to one end of said cord, a needle secured at substantially its central portion to the other end of said cord, and a second tag provided with a relatively small aperture and an enlarged pocket irremovably housing said needle and communicating with said aperture, said needle having a point for forcing its way through the garment for threading the cord therethrough in the application of the first tag to the garment and for facilitating the entrance of the needle through said aperture into the pocket of the second tag in the application of the latter to the garment.

In testimony whereof I have hereunto set my name this 16th day of April 1927.

MATHIAS R. KONDOLF.